July 11, 1961     E. C. BRILL     2,992,365
WATT-SENSING DEVICE
Filed March 24, 1955
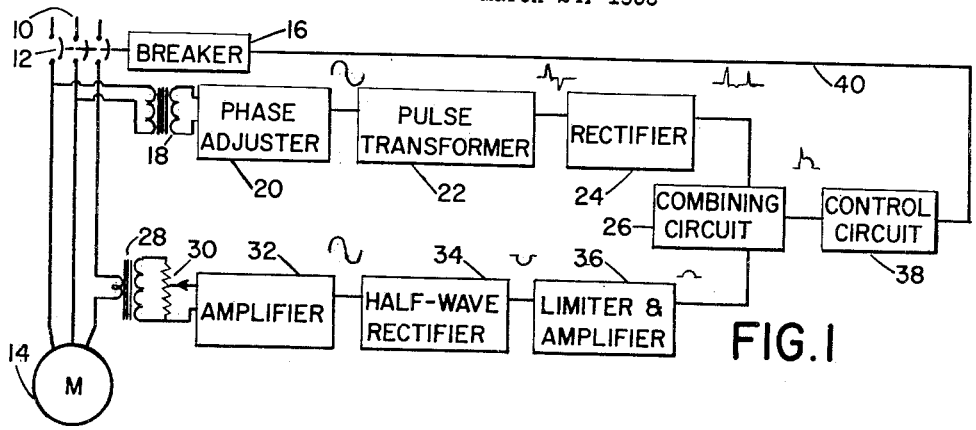
FIG.1
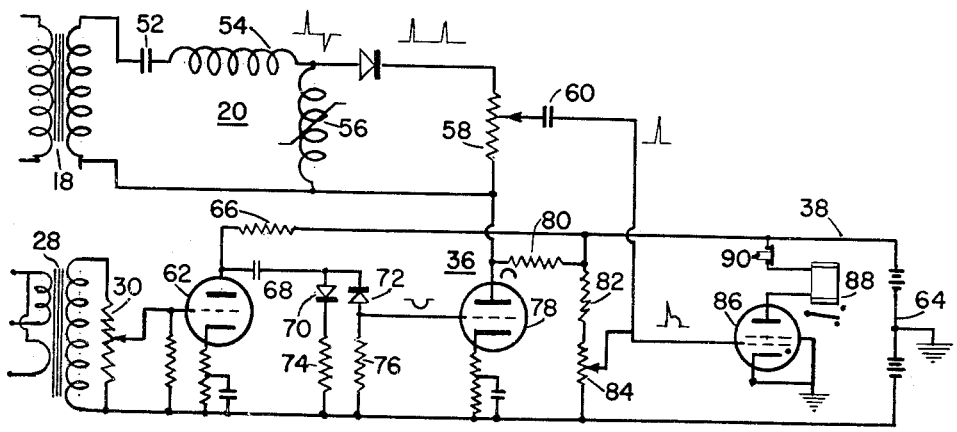
FIG.2
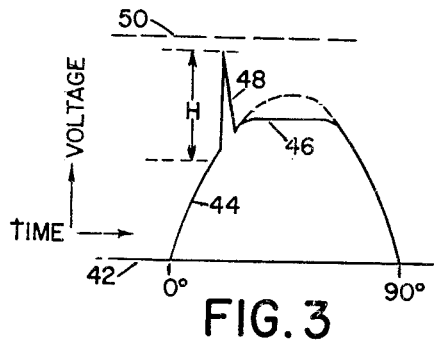
FIG.3
| VOLTAGE | I COS θ* | WATTS | ERROR |
|---|---|---|---|
| 80% | 120% | 96% | 4.0% |
| 90 " | 110 " | 99 " | 1.0 " |
| 100 " | 100 " | 100 " | 0 " |
| 110 " | 90 " | 99 " | 1.0 " |
| 120 " | 80 " | 90 " | 4.0 " |
*FOR CONSTANT SUM E+I COS θ
FIG.4

United States Patent Office 2,992,365
Patented July 11, 1961

2,992,365
WATT-SENSING DEVICE
Everett C. Brill, P.O. Box 333, Simsbury, Conn.
Filed Mar. 24, 1955, Ser. No. 496,567
5 Claims. (Cl. 317—51)

This invention pertains to electrical systems, and more particularly to such a system providing means for sensing the instantaneous power or watts being delivered from an alternating current supply line to a load. As is well known, the determination of power in an alternating current system is complicated by the fact that the product of current and voltage considered as scalar quantities does not reflect power in watts unless corrected for the phase angle between the voltage and the current. Power in an alternating current system is measured by the product $$E \times I \times \text{cosine } \theta$$

in which $\theta$ is the phase angle between the current and the voltage waves.

Conventional power sensing or measuring arrangements for alternating current circuits utilize meters which are especially designed so as to respond only to the product of the voltage and the in-phase component or current, which latter is of course equal to $I$ cosine $\theta$, and such alternating current wattmeters give a reliable indication of true power under conditions in which the phase angle or power factor of the load is relatively constant. However, for the purpose of protecting motors or other load equipment, such devices cannot respond to instantaneous true power with sufficient speed to provide the protection desired. In addition, motors and other load devices often depart from their rated load conditions of operations, so that the assumption made with respect to average operating conditions, and for which normal adjustments of known power measuring devices are set, is erroneous, so that the close measurement of power in watts cannot be accomplished.

An important field of application for the instantaneous measurement of true power is in the field of protective devices, in which it is desired to disconnect a load device whenever the instantaneous power exceeds a certain level, and regardless of whether this excessive power occurs during a period of high or low average load, or high or low power factor operation, or results from a change in either current or voltage from the normally expected values. The watt-sensing device of the present invention amply satisfies this object, and in addition, as will be pointed out below, is generally useful where it is desired to register or measure instantaneous power for other purposes, either to set a limit beyond which some corrective or indicating action will occur, for the regulation of load devices to maintain the total connected load within prescribed limits, or for other purposes.

Since the measurement of instantaneous power in an alternating current circuit has heretofore involved the multiplication of the three factors mentioned above, it might appear that considerable complication would be involved in obtaining the desired result, especially in a system intended to be responsive to instantaneous power levels. The present invention provides ways and means for registering the occurrence of power levels in excess of any desired magnitude by a summation process, which has been discovered to be valid for all practical relationships between current, voltage and phase angle. This feature of the invention greatly simplifies the circuitry, while providing a system which is instantaneously responsive to all of the parameters together affecting circuit power. Basically, the invention provides separate channels for measuring or registering instantaneous values proportional to the line voltage and the line current, converts one of these values to the form of a narrow pulse whose voltage amplitude is proportional to the magnitude of said value, and applies the outputs of the two channels to a combining circuit which senses the instantaneous sum of the values, or which is responsive to a condition in which said instantaneous sum exceeds a predetermined level at which corrective or supervisory action is to be initiated. The conversion of the signal in one channel to a narrow pulse which in effect rides upon a sinusoidal voltage wave produced by the other channel, eliminates all complication due to the phase angle between the original load current and voltage. It also makes feasible the application of the novel summation principle to avoid the necessity for complicated multiplication operations.

The above and other objects and advantages of the invention will best be understood by referring now to the following detailed specification of certain preferred embodiments of the invention, given by way of example, and taken in connection with the appended drawings, in which:

FIG. 1 is a schematic diagram, principally in block form, showing the novel arrangement of the components of one form of the invention, FIG. 2 is a schematic diagram of the same general system as FIG. 1, but with the actual construction of the individual components more precisely indicated, FIG. 3 is a graphical representation of the combined outputs of the two sensing channels of FIGS. 1 and 2, and FIG. 4 is a tabulation showing the accuracy obtained with respect to the substitution of the novel summation for multiplication in determining instantaneous power or watts.

Referring first to FIG. 1 of the drawings, an electrical alternating current system is indicated in a representative way by the three-phase supply line 10 connected through circuit breaker contacts 12 to a load here shown as motor 14. This system is purely conventional, and is illustrated merely for the purpose of explaining the manner in which the invention can be applied to such a typical arrangement for protective purposes. Therefore, and as will appear, it is to be understood that the supply system may be of another type, such as a single phase or two-phase type, and the load device may be, instead of a motor 14, any instrumentality which can draw electrical power from such a supply line.

Numeral 16 designates wholly conventional operating or tripping equipment for the circuit breaker contacts 12, such as a solenoid tripping device; obviously, and as will be apparent to those skilled in the art, the mechanism comprising contacts 12 and operating device 16 may be of any desired type such as conventional motor starting or protective relaying equipment.

Voltage-sensing channel

As has been indicated, current and voltage information is obtained from the load circuit over two distinct channels. For the purpose of explaining the present invention, the voltage information is shown as derived from a pair of the three phase-conductors via a conventional voltage transformer 18 whose purpose is merely, where necessary, to change the line voltage to a magnitude suitable for application to the measuring components of the invention. Following transformer 18, and supplied therefrom, is a manually adjusted phase shifting circuit 20 which is incorporated in order to provide compensation for any phase shifts producted within the measuring circuits themselves. Ordinarily this element, when once adjusted, will not need to be altered during installation and use of the protective devices, because the incidental phase shifts of the various components will ordinarily be constant. However, since the particular embodiment being described is intended for monitoring a three-phase circuit under such conditions that the current derived from the current-monitored phase conductor leads (in phase angle) the voltage derived from the other two phase-conductors, the phase shifting device 20 may also be used to introduce in intentional 90° phase shift in the voltage-sensing channel where required. Thus, the same equipment so adjusted could be utilized without further change for monitoring an induction motor load connected to a single phase system; i.e., one in which the current will lag the voltage in phase angle.

The phase-adjusted voltage wave derived from the supply line is applied from element 20 to a pulse generator, converter, or transformer 22, whose function is to modify the essentially sinusoidal form of the voltage information and put it into the form of a narrow pulse whose amplitude will be proportional to the measured line voltage. Such equipment may take various forms, one of which will be described in more detail below by way of explanation. In any event, the output of pulse generator 22 is, as indicated by the symbolic wave form adjacent its output, a succession of narrow pulses corresponding to the respective positive and negative halves of the sine wave applied at its input, the heights of these pulses being proportional to the amplitude of that sine wave.

The modified voltage information, which still has both positive and negative-going magnitudes, is now applied to a clipping circuit 24 which is essentially a rectifier in that it eliminates alternate pulses of one polarity. Thus, as indicated by the wave symbol at the output of block 24, the negative-going pulses have been eliminated leaving only the positive. These remaining pulses are then applied to one input of a combining circuit 26 which will be further described below.

*Current-sensing channel*

The current drawn by the load 14 is shown as derived from the third phase-conductor, the total current in which traverses the primary winding of a current transformer 28 which produces at its secondary winding terminals a voltage whose amplitude is proportional to the load current as measured in said third phase-conductor. This "current-proportional" voltage signal is applied to a potentiometer 30 from which a desired fraction is selected by the movable tap in the known way, and furnished to an alternating current amplifier 32 whose output will be a sinusoidal voltage wave proportional in amplitude to the current drawn by the load, this amplitude being set at an appropriate level for measurement by the setting of potentiometer 30 and/or the gain of amplifier 32. The full wave output from amplifier 32 is applied to a half-wave rectifier 34 which eliminates either the positive or negative half cycles; the positive half-wave is eliminated in the embodiments shown, the negative wave being retained as symbolically shown at the output of rectifier 34. From this point, the current-proportional voltage signal passes to a combined limiter and amplifier 36 which effectively limits the peak of the retained half-wave, adjusts the level of that peak to a pre-selected value, and incidentally reverses the polarity (in the embodiments shown) to produce a positive-going, limited half-sine wave voltage pulse which is essentially in phase with the current drawn by the load and whose peak level is determined by the magnitude of the load current. This signal is applied to the other input of combining circuit 26.

*Combining circuit*

According to the invention, the voltage and current signals obtained as above described are to be added on an instantaneous basis, and this is accomplished by the combining circuit 26 in any suitable way to produce an output in which the pulse carrying the voltage information rides upon the shaped half-sine-wave carrying the current information. This instantaneous addition may be accomplished in various ways known to those skilled in the art, and examples of which will be detailed below. The form of the output information is indicated at the output of combining circuit 26 by a pulse-on-pulse symbol. The instantaneous sum information is then applied to the control circuit 38 which is arranged to respond whenever the instantaneous sum (value of the voltage pulse plus the simultaneous value of the current wave) exceeds a certain level which has been determined as the operating point for the initiation of a control action, such as, the protective interruption of the load supply circuit or the unclutching of the load from the motor. Thus, device 38 may be a thyratron, a relay or a combination thereof capable of operating the circuit breaker 16 over the control channel 40. Alternatively or additionally, the control circuit may operate auxiliary supervisory signals or it may initiate corrective action other than interruption of the load supply.

For a better understanding of the invention, reference may now be made to FIG. 3 of the drawings, which is a graphical representation of the output information from combining circuit 26. As there shown, the voltage output of the combining circuit is indicated with respect to a zero reference line 42, numeral 44 designating the current-proportional half-sine-wave derived from the current channel, and having the flattened pedestal or top 46 due to the limiting action of amplifier 36. The addition to this voltage of the pulse signal from the voltage-sensing channel results in the pulse 48 of that channel "riding" upon the modified sine wave 44. It is clear that the peak voltage in the output circuit of combiner 26 will be the result of adding the height H of pulse 48 to the instantaneous value of modified sine wave 44, and matters are arranged so that whenever the effective instantaneous sum reaches or exceeds a predetermined level (such as indicated by dash line 50) the control circuit 38 will be activated.

The purpose of limiting or flattening the top 46 of wave 44 is to limit this wave to the effective nominal amplitude of the voltage-channel output pulse, preventing the peak of the positive half-sine-wave voltage from becoming higher, under poor power factor conditions, than the combined height of the pulse and wave.

It will be observed from the above that the invention has accomplished a determination of instantaneous power, or true wattage, without the complication of multiplying circuits and their attendant difficulties of calibration and maintenance, and without any apparent special procedure for correcting for the phase angle between the current and voltage applied to the load.

This has been accomplished by the use of a special relationship which is an important feature of the invention, in accordance with which the true power can be expressed as the sum of a voltage and the in-phase component of current, for practical operating conditions, without departing more than a tolerable amount from the result which would be obtained by multiplication. In the first place, the factor of phase angle has been eliminated by the manner in which the sum is taken; to wit, by taking the instantaneous sum of current and voltage information while the phase angle varies in the same way that it does in the load circuit. Reference to FIG. 3 will clearly show that if the instantaneous amplitudes of the sine wave 44 and the pulse 48 remain constant, and the phase angle is shifted so that pulse 48 occurs nearer the 0° point of the sine wave, the instantaneous sum will be reduced. On the other hand, if the pulse 48 rides higher on the sine wave 44, the instantaneous sum will be raised. Hence, the manner of taking the sum inherently compensates for variations in phase angle, and to this extent variations in the true power. It is true that during the period in which pulse 48 rides along the flat pedestal 46 of the sine wave, variation in phase angle will not affect the value of the sum under these conditions. However, for all purposes in which the user is interested in instantaneous power, the problem is the determination of a condition in which a predetermined maximum or optimum level is exceeded. By proper selection of the level 50 at which the control 38 is to be activated, the arrangement described will respond accurately to instantaneous watts or power in the load circuit.

The manner in which multiplication of the voltage by the in-phase current component is avoided will best be understood by referring to the tabulation of FIG. 4, in which the value of true watts is shown for various values of line voltage from 80 to 120% of rated voltage. It will be seen that the first two columns show percentage values of line voltage and of the in-phase component of current which in all cases add to 200, this figure of 200 representing a summation level corresponding for example to the level 50 of FIG. 3. The third column of the tabulation indicates the true instantaneous power, or the product of voltage times $I$ cosine $\theta$, and it will be seen from the fourth column of the tabulation that even for the extreme values of voltage deviation considered, the error in power registration is not over 4%, which is considered negligible for practical purposes. However, it is obvious that if greater precision is needed, the same can be obtained by causing the voltage signal pulse to vary hyperbolically with line voltage in a manner fully described and claimed in my prior Patent No. 2,532,285, issued December 5, 1950.

FIG. 2 of the drawings represents in schematic form a detailed circuit following generally the arrangement of FIG. 1, but illustrating more specifically certain preferred instrumentalities. As in FIG. 1, the voltage input transformer is designated 18, and it is shown as feeding the voltage information to a pulse generator or peaking circuit (as a whole designated 20) which produces from the sinusoidal output of transformer 18 a succession of narrow pulses proportional in height to the amplitude of the voltage applied to the load. The sine wave input is coupled through a condenser 52 to a series inductance 54 of conventional type, the combination being shunted by a saturable reactor 56. The values of the capacitance of condenser 52, and the inductances 54 and 56, are so chosen that the series combination of all three is nearly resonant at the supply frequency. Actually, since the inductance of the saturable reactor 56 varies with the applied voltage in the well-known manner, the inductance 54 is chosen such that the series circuit is slightly inductive when 56 is unsaturated, and is slightly capacitive when 56 is saturated. Thus, when 56 is saturated (during either positive or negative maxima of the applied voltage), the current in the series circuit leads the applied voltage by nearly 90 electrical degrees. Hence, the voltage across 56 is nearly 180 degrees out of phase with respect to the applied voltage, and because its saturated inductance value is very low, the voltage across 56 is very small in magnitude. When, however, the applied voltage is of such instantaneous value that 56 is unsaturated, the inductance thereof is large and the voltage drop across it will also be large. By proper choice of the saturable inductor, it may be made to become unsaturated only during a brief interval while the applied voltage is passing through zero, so that the output taken across 56 is a succession of positive and negative pulses as indicated symbolically at the top of inductor 56 in the drawing. The phase-correcting network 20 of FIG. 1 is not shown separately in FIG. 2, as it may be wholly conventional. Also, phase adjustment is readily obtained by varying either condenser 52 or reactance 54.

It will be obvious to those skilled in electronics that alternative peaking or pulse-generating circuits may equally well be employed; however, for sinusoidal input waves, as considered herein, the peaker just described has advantages in not requiring much equipment, and being free from the maintenance and power supply requirements of electron tubes.

Since only the positive (or negative) going pulses are necessary for the simplest case, the rectifier 24 is included, the same being shown as a half-wave solid rectifier in series with the output of the peaker. Included in this series circuit is the potentiometer resistance 58, from which the desired fraction of the single-polarity pulse voltage is coupled to the combining circuit through condenser 60.

Again as in FIG. 1, FIG. 2 shows the current information as derived from a current transformer 28, the same being now shown with plural primary windings merely to permit use of the apparatus on circuits of widely different current requirements. The output of the secondary winding is applied to the potentiometer 30, and the selected output fraction is applied in turn to the grid-cathode circuit of an amplifier tube 62 having conventional grid-bias circuits as well known in the art. Plate or anode supply is indicated as furnished by a battery 64 feeding the anode of tube 62 through series dropping resistor 66, and the amplified current-proportional signal is taken from the anode by coupling condenser 68 and will be proportional to the current in the load circuit and in constant phase relation thereto.

The signal obtained as above is applied to a double-diode limiter comprising two half-wave rectifiers 70, 72 reversely connected across the signal source (space path of tube 62) and each having a series resistor as at 74, 76. The operation of the device is to provide a negative half sine wave input to amplifier-limiter tube 78, this being accomplished by diode 72 in series with resistor 76. Diode 70 and resistor 74 provide a return path to prevent blocking due to a charge accumulating on condenser 68.

While it is practical to utilize both polarity sine waves, to obtain sampling during each half-cycle of the line voltage, the simplified system shown uses only the negative-going wave obtained once each cycle of the supply, and hence the grid-to-cathode circuit of the following amplifier 36 is driven by the current through diode 72 only. Again, the waveform from the diode 72 is indicated at its output circuit.

Final amplification and limiting of the half-wave occurs in tube 78, again provided with conventional bias circuit and supplied from anode voltage source 64 through dropping resistor 80. The potentiometer 84 provides the bias for the grid of tube 86. Actually, it will be seen that the combining of the two signals is effected by deriving the input to thyratron 86 (which is a part of the control circuit 38 of FIG. 1) from the series addition of the anode-circuit output voltage of tube 78 to the voltage appearing across the lower part of potentiometer 58 set by the potentiometer tap or slider. Potentiometers 58 and 30 permit individual adjustment of the magnitudes of the pulse and the sine-wave half-cycle, and they may be uncontrolled if desired to provide a single adjustment of watts at which the control action will be initiated. Individual adjustment is shown to permit the total voltage to be divided approximately equally between contributions from the respective channels, a condition which makes for best sensitivity of response.

The control circuit in FIG. 2 is shown as utilizing a gas tube 86 arranged with its control or starter electrode or grid receiving the summated signals of the voltage and current channels. The thyratron is there shown as supplied from the source 64 of anode potential, and its space path is in series with the winding of a relay 88 and a normally closed reset switch or push button 90. When the instantaneous sum of the voltage and current signals exceeds the desired and pre-set level, such as level 50 of FIG. 3, the tube 86 will conduct and operate the relay 88 to permit its contacts to interrupt the supply circuit, operate the breaker 12, 16 of FIG. 1, or initiate any other control, supervisory, or registration operation. Since the tube 86 will remain conducting after its grid potential drops, the re-set switch must be depressed to open the anode circuit of tube 86 and restore the circuit to operative sensing condition. Obviously, a separate A.C. supply for the thyratron would provide automatic re-set after each cycle, if desired, in the well-known manner. Additionally, automatic re-set after a predetermined delay could be achieved by utilizing A.C. supply and a time-delay relay in place of relay 88, as also well known in the circuit protection art.

While the summing of the instantaneous values of the two signals has been shown herein as accomplished by a series connection, various other adding circuits could be employed. Thus, conventional resistive adding in the manner of analogue computers could be employed, or the two signals could be applied to different control grids of a conventional multi-grid mixer tube or screen-grid thyratron. The manner in which summation is accomplished is not to be taken as a limitation on the present invention.

From the above description and the drawings, it will be realized that the invention comprehends a novel procedure (the summation of current-proportional and voltage-proportional signals under controlled conditions) to obtain a control operation in response to true power or watts, and to do so by implementation which is simpler and more practical than would be required by the application of multiplication techniques and power-factor correction in the ordinary process of obtaining power indications by the application of Ohm's law. It is to be understood that the particular application of the described procedures and instrumentalities is not limited to the control or protection of load circuits, but is capable of wide use where the true power indication is required. Moreover, in addition to the variants specifically mentioned above, various other changes and modifications in the particular circuits and components will occur to those skilled in the art to which the invention appertains. I therefore do not intend to limit the scope of the invention to the particular arrangements described herein, except insofar as may be required by the scope of the appended claims.

What is claimed is:

1. Apparatus responsive to power in an alternating current load circuit, comprising means for deriving from said circuit signals proportional respectively to the load circuit voltage and the load circuit current, means for deriving from one of said signals a succession of narrow pulses proportional in amplitude to the magnitude of said one signal and in predetermined phase relation thereto, means for deriving from the other of said signals a substantially sinusoidal wave proportional in amplitude to the magnitude of said other of said signals and in predetermined phase relation thereto, means for superimposing said pulses as increments upon said wave, at a point on each cycle of said wave corresponding to the load circuit voltage-current phase relationship to form a composite signal, and means responsive to the instantaneous value of said composite signal for indicating the power traversing said load circuit.

2. Apparatus responsive to power in an alternating current load circuit, comprising means for deriving from said circuit signals proportional respectively to the load circuit voltage and the load circuit current, means for deriving from one of said signals a succession of narrow pulses proportional in amplitude to the magnitude of said one signal and in predetermined phase relation thereto, means for deriving from the other of said signals a substantially sinusoidal wave proportional in amplitude to the magnitude of said other of said signals and in predetermined phase relation thereto, means for summing the instantaneous values of said pulses as increments upon said wave, said increments being positioned on each cycle of said wave at a point corresponding to the voltage-current phase relationship in said load circuit, and means responsive to the instantaneous value of said summation for initiating a control action.

3. In watt-sensing apparatus for alternating-current circuits, means for providing a representation of instantaneous circuit voltage as a train of pulses substantially narrower than a half-cycle of the supply voltage, each pulse representing the instantaneous value of supply voltage and its relative phase, means for providing a sinusoidal wave representative of the instantaneous value of supply circuit current and its relative phase, and means for instantaneously adding the amplitudes of said pulse train and said sinusoidal wave in a manner that compensates for variation in the voltage-current phase relationship of said alternating current circuit.

4. Apparatus responsive to power in an alternating current load circuit, comprising means for deriving from said circuit signals corresponding respectively to the load circuit voltage and the load circuit current, means for deriving from said load circuit voltage signals a succession of narrow pulses proportional in amplitude to the value of said voltage, means for deriving from said load circuit current signals a substantially sinusoidal wave proportional in amplitude to the magnitude of the load current, and means for superimposing respective ones of said pulses upon the sine wave signal with each pulse at a point on one wave cycle of said sine wave signal corresponding to the phase relationship between the voltage and current in said load circuit, whereby a composite signal is produced, the maximum value of which is substantially proportional to the power in said load circuit.

5. In a control device responsive to power in an alternating current load circuit, means for deriving signals from said alternating current load circuit corresponding to the voltage therein, means for deriving signals from said alternating current load circuit corresponding to the current flowing therein, means to convert one of said signals to a series of narrow pulses proportional in amplitude to the magnitude of said signals, means for converting the other of said signals to a sinusoidal wave proportional in amplitude to the magnitude of said last mentioned signals and in predetermined phase relation thereto, and means for superimposing said pulses on said sinusoidal wave signals, each at a point on one cycle of the wave corresponding to the voltage-current phase relationship in said alternating current load circuit, whereby a composite signal is produced, the maximum value of which is substantially proportional to the power in said alternating current load circuit.

References Cited in the file of this patent

UNITED STATES PATENTS

| | | |
|---|---|---|
| 1,869,209 | Mead | July 26, 1932 |
| 2,299,561 | Bivens | Oct. 20, 1942 |
| 2,399,322 | Carlin | Apr. 30, 1946 |
| 2,404,643 | Livingston | July 23, 1946 |
| 2,492,556 | Gruchy | Dec. 27, 1949 |
| 2,532,285 | Brill | Dec. 5, 1950 |